Patented Oct. 29, 1940

2,219,543

UNITED STATES PATENT OFFICE 2,219,543

THIOBARBITURIC ACID DERIVATIVES

Arthur C. Cope, Bryn Mawr, Pa., assignor to Sharp & Dohme, Incorporated, Philadelphia, Pa., a corporation of Maryland No Drawing. Original application October 15, 1936, Serial No. 105,826. Divided and this application December 20, 1939, Serial No. 310,147

8 Claims. (Cl. 260—260)

This invention relates to new derivatives of thiobarbituric acid. It relates more particularly to new $\Delta_1$-alkenyl thiobarbituric acids, and their salts, and to new processes for their production. The new $\Delta_1$-alkenyl thiobarbituric acids are indicated to have valuable hypnotic and anaesthetic properties, with relatively low toxicity.

The compounds produced in accordance with this invention include various thiobarbituric acid derivatives in which the two hydrogens attached to the methylene carbon are replaced, one by a $\Delta_1$-alkenyl group, and the other by an alkyl group, an aralkyl group, an aryl group, a cyclohydrocarbon group, such as the cyclohexyl or cyclopentyl group, or other hydrocarbon or substituted hydrocarbon residue. The compounds may be represented by the graphic formula

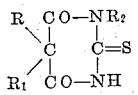

in which R represents a $\Delta_1$-alkenyl group, which may have more than one double bond, and $R_1$ represents another hydrocarbon or substituted hydrocarbon group, which may be saturated or unsaturated, and which may have an open or closed chain, and $R_2$ represents hydrogen or an alkyl group which may be saturated or unsaturated and may advantageously contain from one to three carbon atoms. These compounds have a nitrogen-linked hydrogen capable of being replaced to form salts, and salts of the acids may be readily prepared by replacing this hydrogen by a monovalent metal, such as sodium or potassium, or an equivalent of a polyvalent metal, such as calcium or magnesium, or a nitrogen base, such as ammonia, alkylamines or dialkylamines, such as ethylamine or diethylamine, alkynolamines, such as diethanolamine, ephedrine, cocaine, phenylpropanolamine, or the like.

These compounds may be produced by various methods. One advantageous method consists in condensing a di-ester of the corresponding malonic acid with thiourea, in the presence of sodium ethoxide at ordinary pressure. Another advantageous method consists in condensing the corresponding cyanoacetic ester with thiourea, in the presence of sodium ethoxide or the like, and subjecting the resulting imino derivative to hydrolysis to remove the imino group. When thiobarbituric acids are produced by this last method, care should be taken when hydrolyzing off the imino group to avoid replacing the sulfur atom with an oxygen atom with the production of the corresponding barbituric acid, rather than the desired thiobarbituric acid. These methods will be illustrated in specific examples, with particular reference to the production of secondary $\Delta_1$-alkenyl alkyl derivatives, but the invention is not limited thereto.

Example 1.—Into a suitable reaction vessel, equipped with a stirrer, reflux condenser, and dropping funnel are placed about 200 parts of anhydrous alcohol and 23.0 parts of sodium are dissolved therein. 30 parts of urea and 76 parts of ethyl isopropenyl malonic ester are then added and the mixture is refluxed for about 8 to 12 hours, with constant stirring, after which the alcohol is distilled off at reduced pressure. The residue is taken up in water, and the neutral products which it contains (amides or unused ester) are removed by extraction with ether. The ether is then distilled from the aqueous layer under reduced pressure, and the aqueous solution is cooled in an ice bath and slowly acidified with about 125–150 parts of concentrated hydrochloric acid. 5-isopropenyl ethyl barbituric acid precipitates. This product is purified by recrystallization from an appropriate solvent, such as water or aqueous alcohol. It melts at 183–184° C. The corresponding thiobarbituric acid, obtained in a similar manner, melts at 191.0–191.5° C.

If, in the process described in the preceding example, the corresponding cyanoacetic ester is used, the acidification precipitates 5-isopropenyl-5-ethyl-4-imino barbituric acid. This imino derivative may be converted into the corresponding barbituric acid by hydrolyzing with boiling mineral acid solution, e. g., 20% hydrochloric or sulfuric acid.

If, in the process of the foregoing example, thiourea is used, in about the same molar proportion as the urea is used, the corresponding thiobarbituric acid is obtained. Similarly, when thiourea is condensed with a $\Delta_1$-alkenyl alkyl cyanoacetic acid, a 4-imino thiobarbituric acid is obtained, which may be hydrolyzed with boiling mineral acid to give the corresponding thiobarbituric acid, the hydrolysis being such that the sulfur atom is not replaced by an oxygen atom.

Example 2.—30 parts of urea and 70 parts of methyl isopropenyl malonic ester are reacted in a solution of 23 parts of sodium in 300 parts of absolute alcohol, as in Example 1. 5-methyl-5-isopropenyl barbituric acid is produced. If an equivalent amount of thiourea is used in place of the urea, the corresponding thiobarbituric acid is produced.

Example 3.—79 parts of ethyl 1-n-propyl $\Delta_1$- butenyl cyanoacetic acid methyl ester, and 38 parts of thiourea, are reacted in a solution of 23 parts of sodium in 200 parts of absolute alcohol as in Example 1. The reaction mixture, after the removal of alcohol and neutral products, yields on acidification the corresponding imino thiobarbituric acid, which melts at 224–225° C. This compound, when treated for 20 minutes with boiling 20% hydrochloric acid yields 5-ethyl 5-1-n-propyl-Δ1-butenyl thiobarbituric acid, melting at 169–169.5° C. The corresponding barbituric acid melts at 137–138° C.

*Example 4.*—80 parts of allyl isopropenyl malonic ester and 30 parts of urea are reacted in a solution of 23 parts of sodium in about 200 parts of absolute alcohol, as in Example 1. The 5-allyl 5-isopropenyl barbituric acid obtained has a melting point of 141.5–142° C. The corresponding thiobarbituric acid, obtained in a similar manner, using thiourea, has a melting point of 177.0–177.5° C.

The Δ1-alkenyl alkyl malonic esters which may advantageously be used for the production of corresponding 5,5-Δ1-alkenyl alkyl thiobarbituric acids may be readily prepared from alkylidene malonic esters by the alkylation of the alkylidene malonic esters with an alkyl salt in the presence of a sodium alkoxide. The Δ1-alkenyl alkyl cyanoacetic esters may be readily prepared by the condensation of the corresponding alkylidene cyanoacetic ester with an alkyl salt in the presence of a sodium alkoxide or the like. Or, both the alkyl Δ1-alkenyl cyanoacetic esters and the malonic esters may be readily prepared by reacting an alkyl salt, such as alkyl halide or sulfate, with an alkylidene malonic ester or cyanoacetic ester in an inert solvent in the presence of metallic sodium.

A wide range of secondary Δ1-alkenyl thiobarbituric acids may be prepared by the process of the present invention, and are included as new products within the scope of the invention. Included among the new secondary Δ1-alkenyl thiobarbituric acids which may be prepared by the process of the foregoing examples, are compounds in which the secondary Δ1-alkenyl group may be one of the following:

Isopropenyl
    1-methyl-Δ1-n-propenyl
    1-methyl-Δ1-butenyl (normal or iso)
    1-methyl-Δ1-pentenyl (normal or iso)
    1-methyl-Δ1-hexenyl (normal or iso)
    1-methyl-Δ1-heptenyl (normal or iso)
    1-ethyl-Δ1-propenyl
    1-butyl-Δ1-pentenyl and others, and in which the other bond of the methylene carbon of the thiobarbituric acid may be attached to one of the following radicals:

Methyl
    Ethyl
    Propyl (normal or iso)
    Butyl (normal, iso or secondary)
    Allyl
    Crotyl
    Amyl (normal, iso or secondary)
    Cinnamyl
    Citronellyl
    Hexyl (normal, iso or secondary)
    Cyclohexyl
    Cyclopentyl
    Phenyl-ethyl
    Benzyl
    Heptyl (normal, iso or secondary)

and others.

These Δ1-alkenyl thiobarbituric acids have a nitrogen-linked hydrogen replaceable by a metal or a nitrogen base, and hence it is possible to form salts of these acids. For example, the sodium salts, which are water-soluble, may be conveniently prepared by reacting one of the free acids with an equivalent of sodium ethoxide in absolute alcohol. If the resulting salt is too soluble in alcohol to be readily separated, it may be precipitated by the addition of ether, ligroin, or the like.

The term "alkyl" as used in this specification and the appended claims is to be construed in its broader sense, as including both saturated and unsaturated compounds, with straight or branched chains, as well as aralkyl compounds; the term "alkylidene" is to be construed in its broader sense, as including aralkylidene compounds and compounds in which the alkylidene group has straight or branched chains which may be saturated or unsaturated; and the term "Δ1-alkenyl" is also to be construed in its broader sense, to include compounds in which the Δ1-alkenyl group is straight or branched chain, including compounds in which this group contains not only the Δ1-double bond, but also other unsaturated linkages.

This application is a division of my copending application Serial No. 105,826, filed October 15, 1936.

I claim:

1. Secondary 5-Δ1-alkenyl thiobarbituric acids in which the alkenyl group is an open chain group.

2. 5-Δ1-alkenyl thiobarbituric acids in which the alkenyl group is an open chain group having at least three carbon atoms.

3. 5-Δ1-alkenyl 5-alkyl thiobarbituric acids in which the alkenyl group is an open chain group having at least three carbon atoms.

4. Secondary 5-Δ1-alkenyl 5-alkyl thiobarbituric acids in which the alkenyl group is an open chain group.

5. 5-alkenyl thiobarbituric acids in which the alkenyl group has at least four carbon atoms and is an open chain group.

6. Secondary 5-alkenyl thiobarbituric acids in which the alkenyl group has at least four carbon atoms and is an open chain group.

7. Secondary 5-alkenyl 5-alkyl thiobarbituric acids in which the alkenyl group has at least four carbon atoms and is an open chain group.

8. Compounds of the class consisting of 5-Δ1-alkenyl thiobarbituric acids in which the alkenyl group is an open chain group having at least three carbon atoms, and their salts.

ARTHUR C. COPE.